June 1, 1965  R. J. KOUTNIK  3,186,430
VALVE

Filed Nov. 15, 1962

INVENTOR.
RODERICK J. KOUTNIK
BY
ATTORNEY

June 1, 1965   R. J. KOUTNIK   3,186,430
VALVE
Filed Nov. 15, 1962   3 Sheets-Sheet 2
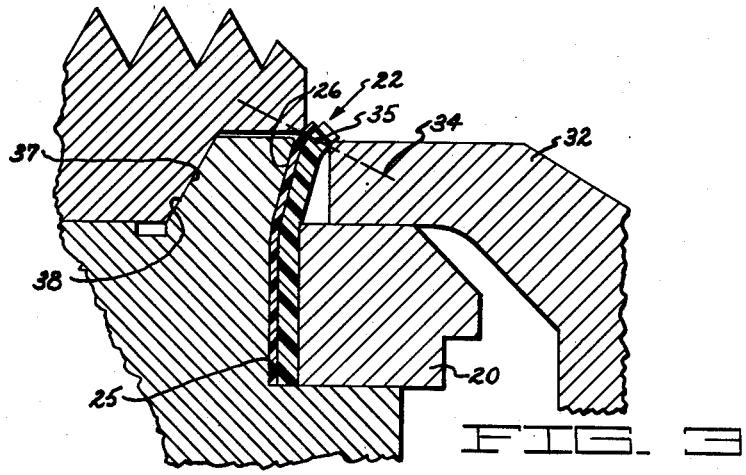
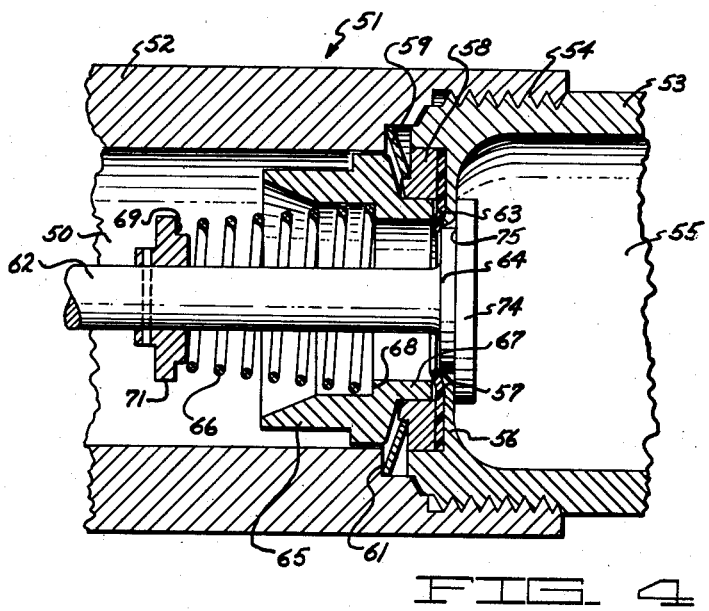
INVENTOR.
RODERICK J. KOUTNIK
BY
ATTORNEY June 1, 1965

R. J. KOUTNIK 3,186,430

VALVE

Filed Nov. 15, 1962

INVENTOR.
RODERICK J. KOUTNIK
BY
ATTORNEY

United States Patent Office 3,186,430
Patented June 1, 1965

3,186,430
VALVE
Rodrick J. Koutnik, Vista, Calif., assignor to Clary Corporation, San Gabriel, Calif., a corporation of California
Filed Nov. 15, 1962, Ser. No. 237,825
14 Claims. (Cl. 137—516.29)

This invention relates to valves and has particular reference to valves for handling fluids wherein extreme temperature variations are encountered.

Difficulties have been encountered heretofore in controlling the flow of cryogenic fluids such as liquid hydrogen and the like wherein temperatures may vary from —420° F. to +180° F. or more, due to the action of such temperature variations upon the materials of the valves. This is particularly true when zero or near zero leakage is required.

During such changes of temperature, any normally soft seating material such as rubber or plastic tends to harden and also change shape due at least in part to contraction and expension of the material.

It therefore becomes a principal object of the present invention to provide a valve capable of controlling cryogenic liquids with a minimum of leakage.

Another object is to provide a poppet type valve utilizing a thin disc type valve member.

Another object is to provide a valve wherein the expansion and contraction of valve elements due to temperature variations will not affect the operation of the valve.

The manner in which the above and other objects of the invention are accomplished will be readily understood on reference to the following specification when read in conjunction with the accompanying drawings, wherein:

FIG. 3 is an enlarged fragmentary sectional view of the sealing element in its closed or sealed position.

FIG. 4 is a sectional view through a relief valve showing an alternate form of the invention.

Figure 1:
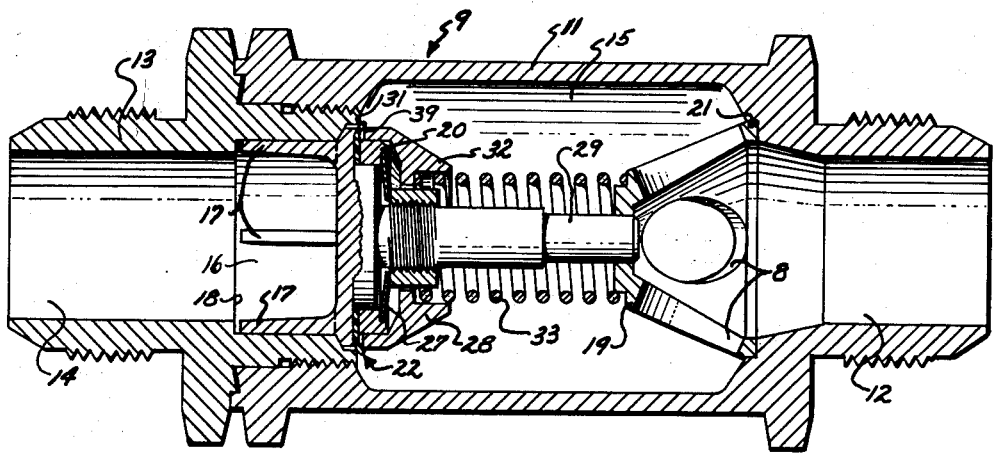
FIG. 1 is a sectional view through a check valve embodying a preferred form of the invention.
Figure 2:
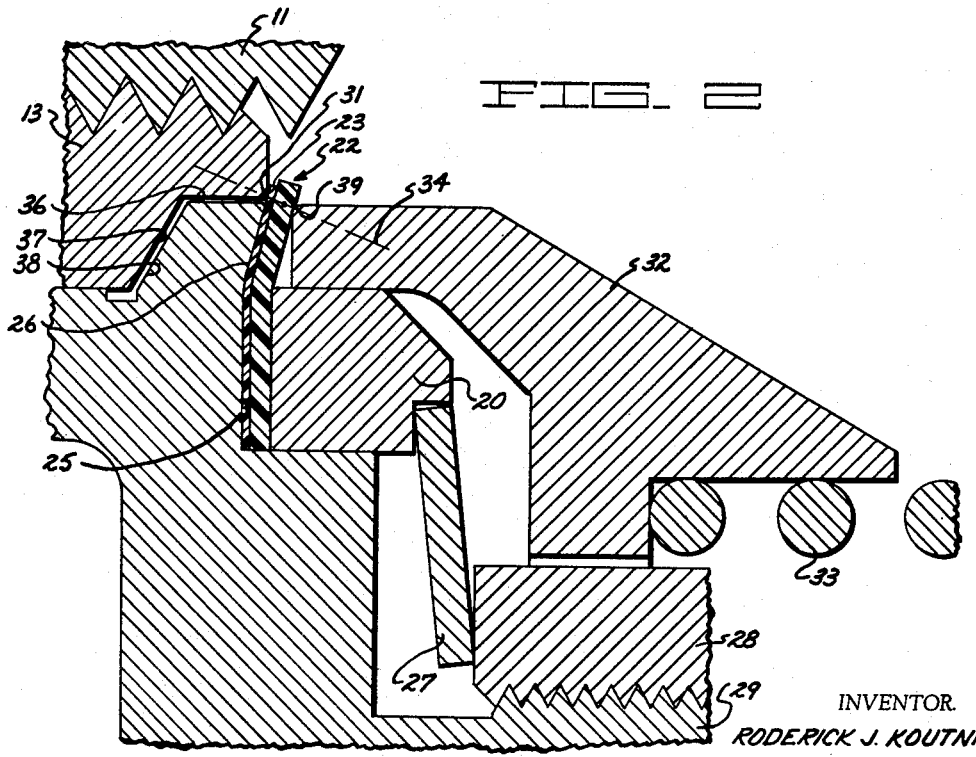
FIG. 2 is an enlarged fragmentary sectional view of the valve seating arrangement in a position intermediate its open and closed positions.

The valve illustrated in FIGS. 1 to 3 is a check valve having a body member 9 which is formed of a body section 11 having an axial opening 15 therein which tapers at one end to an axially aligned outlet passage 12. The opposite end has a fitting 13 threaded therein, which forms an axially aligned inlet passage 14.

A poppet member 16 is axially slidable in the fitting 13 intermediate the inlet and outlet passages, and is guided at one end by four extending legs 71, of which only three are shown, which ride in a relieved portion 18 of the fitting 13. The opposite end of the poppet rides in a conically formed support 19 which is axially aligned in the opening 15 and is supported in a recess 21 in the section 11. The support has openings 8 formed in its conical surface thereby permitting fluid to pass into the outlet passage 12.

An annular closure disc or seal 22 is formed of a flexible material having properties which will withstand extremely low temperatures without becoming brittle, while withstanding large temperature variations without excessive contraction and expansion.

The seal 22 is preferably formed of two plastic materials, FIG. 2, suitably bonded together. The front layer or actual sealing face 23 is a material known in the art as "Mylar" which has a charteristic of withstanding extremely low temperatures while still remaining ductile. The second layer or backing of the seal is of a material known in the art as "Teflon" which can withstand extremely low temperatures but becomes somewhat rigid, providing a stiffening effect for the seal.

The poppet has formed adjacent one end thereof an annular wall comprising a radially extending inner wall section 25 which is coextensive with an outer conical wall section 26.

The seal 22 is clamped against the wall section 25 through an annular ring 20 which retains a constant pressure against the seal through a resilient dished disc or "Belleville" spring 27 which is braced against a nut 28 threaded onto a shank portion 29 of the poppet.

The importance of the above described clamping means for the seal is that under extremely cold conditions the seal contracts in thickness to such an extent that if the seal were directly clamped by the nut 28 the fluid flow would tend to remove the seal from between the wall and the nut. The yieldable means above described holds the seal in place regardless of its condition of shrinkage or hardening.

The seal 22 extends out slightly beyond the periphery of conical wall section 26 to engage with a relatively sharp annular shoulder or corner 31 formed on the fitting 13. It will be noted that each corner has a slightly rounded edge whose radius is less than the thickness of the seal 22.

The seal 22 is yieldably held against the conical wall section 26 by an annular retaining member or ring 32 under the influence of a compression spring 33 mounted between retaining member 32 and the support 19. The retaining ring 32 is slidably fitted over the annular ring 20 and has a relatively sharp annular corner or shoulder 39.

The outed periphery of the retaining member 32 is slightly smaller in diameter than the inside diameter of the annular shoulder 31, so that as the poppet moves to its closed position of FIG. 3 the sealing angle or angle of contact with the seal, as indicated by the dot-dash line 34, passing through the shoulders 31 and 39, will change from its position shown in FIG. 2 to that shown in FIG. 3. This brings about a pinching action or wedging action against the seal to effectively seal the valve. That is, the line of sealing force against the seal tends to rotate in a clockwise rotation about a point 35 as the poppet moves into its closed position.

An annular relieved section 36 is provided in the fitting 13 which forms a blocking shoulder 37 at its end, which cooperates with a shoulder 38 of the poppet to limit movement of the poppet in its closing direction, preventing the same from moving beyond the valve closing position of FIG. 3.

The conical wall section 26 results in a conical forming of the seal at its outer periphery, thereby providing a stiffening effect to aid in maintaining the conical shape of the outer diameter section of the seal, particularly that portion extending beyond the shoulder 39, especially when the poppet is in open position or is moving between open and closed position.

The spring 33 both urges the poppet toward its closed position and normally holds the outer diameter portion of the seal against the conical wall section 26.

The shoulder 31 is slightly rounded to prevent cutting of the seal 22 but is relatively sharp so as to provide a scraping edge for the seal as it is wedged thereagainst, thereby providing a self cleaning action for removing any ice formed on the seal.

To relieve the bind created by the wedging action of the shoulders 31 and 39, the retaining ring 32 under the action of the spring 33 will yield when the pressure against the seal becomes greater than the spring force, thereby preventing binding while still retaining the required pressure to perform the sealing action.

FIG. 4 shows an alternate form of the invention wherein the sealing arrangement is incorporated in a relief valve having a body member 51, comprised of a body section 52 having an axial opening therein forming an inlet passage 50. A second body section 53 which is secured by screw threads 54 to the section 52, has an axial opening therein forming a relief passage 55 which is axially aligned with the inlet passage 50.

The section 52 has formed on its inner diameter a radially inwardly extending annular wall section 56 that is coextensive with a conical inner wall section 57.

An annular closure disc or seal 63 is clamped against the wall 56 through an annular ring 58 which retains a constant pressure against the seal through a "Belleville" spring 59 braced between an annular shoulder 61 on the section 52 and the ring 58.

A poppet 62 is guided through means not shown for axial movement between open and closed positions, and has an annular shoulder 64 formed thereon which is slightly smaller in diameter than the inside diameter of the wall section 57. The shoulder 64 is positioned on the right side of the seal 63 whose inside diameter is slightly smaller than the outside diameter of the shoulder.

An annular retaining member or ring 65 is slideably mounted in the inlet passage 50 and in the ring 58 and is spring urged through a compression spring 66 towards the relief passage 55 so that an annular section 67 will press the seal 63 against the conical wall section 57.

The spring 66 is compressed between an annular shoulder 68 on the retaining ring 65 and a shoulder 69 on a disc 71 pinned to the poppet 62, so as to normally hold the valve closed wherein the seal 63 is wedged between annular shoulders 64 and 73.

An enlarged head 74 is formed on the poppet 62 in the passage 55 and has an outer diameter larger than the inner diameter of the wall 56 so that its face surface 75 rests against the wall 56 to act as a stop, thereby preventing the poppet from moving beyond its illustrated valve closing position.

Figure 5:
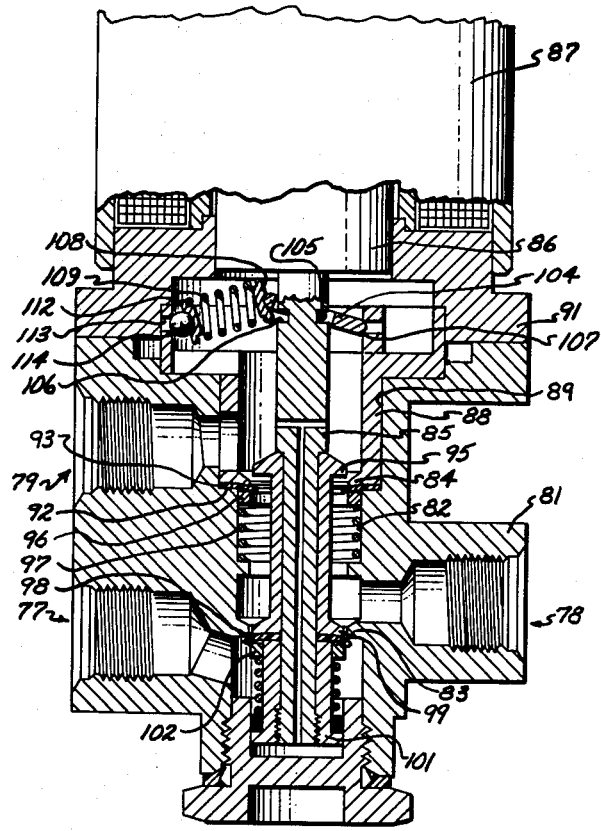
FIG. 5 is a sectional view through a three-way valve showing still another alternate form of the invention.

FIG. 5 shows still another alternate form of the invention wherein the sealing arrangement is incorporated in a solenoid operated three-way valve having an inlet passage 77, a service passage 78 and a vent passage 79, in a valve body 81.

The body 81 has an axial opening 82 to which the passages 77, 78 and 79 are transversely connected in such a manner that the service passage 78 is located intermediate the inlet passage 77 and the vent passage 79.

An annular shoulder 83 is formed in the opening 82 intermediate the passages 77 and 78. Intermediate the passages 78 and 79 is formed a radially inwardly extending annular wall 84.

A poppet member 85 is axially movable in the opening 82 and is connected at one end to an armature 86 of a two coil, double actuating solenoid 87, the details of which are omitted since such solenoids are well known in the art. Energization of one coil of the solenoid moves the poppet to one position and energization of the second coil moves the poppet back to its orignal position.

The wall 84 is formed on the end of a sleeve 88 which fits in an enlarged portion 89 of the opening 82 and is retained in position by an annular ring 91 which is attached to the valve body 81.

An outer diameter portion of the wall 84 and an adjacent annular wall 92 formed by the enlargement of the opening 82 form a clamp for an annular disc or seal 93. The inner portion of the wall 84 is tapered to form a conical section which tapers away from the passage 79.

The inside diameter of the seal 93 is slightly smaller than the inside diameter of the wall 84. Also, the seal, which is held in a conical shape due to wall 84, is slightly smaller than the outer diameter of an annular shoulder 95 formed on the poppet 85. A retaining ring 96 having an inside diameter slightly larger than the outside diameter of the shoulder 95 is slideably mounted in the opening 82 and is held in engagement with an inner diameter section of the seal by a compression spring 97 to provide a wedging type seat similar to that described for the relief valve illustrated in FIG. 4.

The annular shoulder 83 cooperates with a second annular disc type seal 98 which is carried by the poppet and clamped against a radially extending wall 99 on the poppet by a nut 101 which threads onto the main portion of the poppet.

The wall 99 is similar to that described in FIG. 1 and has an outer diameter section which is tapered away from the service passage thereby forming a conical section which molds the seal 98 into a conical shape for stiffening the same. The seal has an outside diameter slightly larger than the inside diameter of the shoulder 83. A retaining ring 102 cooperates with the seal 98 and shoulder 83 in the same manner as that described in FIG. 1 and is held against the seal by a compression spring 110.

The valve, in its illustrated position, has the coil energized which holds the poppet in an upper position, allowing flow from the service passage 78 to the vent passage 79. Upon energization of the other of the coils, the poppet will move down allowing flow from the inlet passage 77 to the service passage 78.

A power failure safety feature is provided at the top of the poppet which comprises a ring 104 which surrounds the poppet and has a cross pin 105 which fits in a circumferential channel 106 in the poppet.

The ring is pivoted at 107 on the sleeve 88 and is held in either of two off-center positions by a compression spring 109. The spring has a cap 108 at one end pivoted on the ring 104 and a second cap 112 at its opposite end, pivoted on a ball 114 detented in a hole 113 in the sleeve 88.

The poppet moving from one position to the other will, through the pin 105, pivot the ring, thereby pivoting the spring 109 and as the ring and spring center lines pass, the spring will snap the ring into its new position whereupon should a power failure occur, the pressure of the spring upon the ring will hold the poppet in position.

Some variable points should be brought out here. As shown in the three-way valve construction of FIG. 5, the means for clamping the seals in position need not be yieldable when the variance in temperature is smaller so that contraction and expansion of the sealing material is no longer an important factor.

Secondly, although the description of the present invention refers to cryogenic type valves which need a yieldable clamping means for the seals, high temperature valves having a wide temperature range also have contraction and expansion problems which would warrant the construction disclosed.

Also, it should be noted that the material for the seals should not be restricted to that previously described, for other types of materials may be used. For example, beryllium copper with a Mylar backing or a thin all metal seal might be used, depending upon the temperature range, chemical characteristics and other associated factors.

Although the invention has been described herein in detail and certain specific terms and languages have been used, it is to be understood that the present disclosure is illustrative rather than restrictive and that changes and modifications may be made without departing from the spirit or scope of the invention as set forth in the appended claims.

Having thus described the invention, what is desired to secure by United States Letters Patent is:

1. A valve device comprising a body member having an axial opening,
   a poppet member movable axially in said opening
      between valve opening and valve closing positions,
   cooperating valve means on said members comprising a first annular valve seating corner on one of said members, means on the other of said members forming an annular radially extending wall, at least a portion of said wall adjacent said corner extending at least substantially conically in a direction wherein the plane of said conical portion will intersect said corner at an angle to the axis of said opening when said poppet member is adjacent said closed position, an annular yieldable closure disc on said other member, a portion of said disc extending in radially overlapping relation to said corner, means for maintaining a portion of said disc which is spaced from said overlapping portion against said wall, said overlapping portion of said disc extending at least substantially conically, yieldable means including an annular retaining member engaging a portion of said disc adjacent said corner;

said retaining member tending to maintain said disc against said wall, said retaining member having a second circular corner radially spaced from said first corner by an amount less than the thickness of said disc, said second corner being effective upon movement of said poppet member to said valve closing position to apply a sealing force to said disc and against said first corner at an angle to the direction of movement of said poppet member, and cooperating stop means on said body member and said poppet member for preventing movement of said poppet member beyond said valve closing position.

2. A valve device comprising a body member having an axial opening, a poppet member movable axially in said opening between valve opening and valve closing positions, cooperating valve means on said members comprising a first annular valve seating corner on one of said members, means on the other of said members forming an annular radially extending wall, an annular yieldable closure disc on said other member, a portion of said disc extending in radially overlapping relation to said corner, said overlapping portion extending conically and terminating away from the plane of said corner, means holding a portion of said disc which is spaced from said overlapping portion against said wall, yieldable means including an annular retaining member engaging a portion of said disc adjacent said corner;

said retaining member having a second circular corner radially spaced from said first corner by an amount less than the thickness of said disc, said second corner being effective upon movement of said poppet member to said valve closing position to apply a sealing force to said disc and against said first corner at an angle to the direction of movement of said poppet member.

3. A valve device according to claim 2 comprising cooperating stop means on said body member and said poppet member for preventing movement of said poppet member beyond said valve closing position.

4. A valve device comprising a body member having an axial opening, a poppet member movable axially in said opening between valve opening and valve closing positions, cooperating valve means on said members comprising a first annular valve seating corner on one of said members, means on the other of said members forming an annular radially extending wall, an annular yieldable closure disc on said other member, a portion of said disc radially overlapping said corner, means for maintaining a portion of said disc which is spaced from said overlapping portion against said wall, and yieldable means including an annular retaining member engaging a portion of said disc adjacent said corner;

said retaining member having a second circular corner radially spaced from said first corner by an amount less than the thickness of said disc, said second corner being effective upon movement of said poppet member to said valve closing position to apply a sealing force to said disc and against said first corner at an angle to the direction of movement of said poppet member.

5. A valve device comprising a body having an axial opening, port forming means in said opening comprising a first annular corner;

a poppet member movable axially in said opening between valve opening and valve closing positions;

said poppet member forming a radially extending inner wall section and a coextensive conically extending outer wall section, closure means on said poppet member comprising an annular yieldable closure disc engageable with said corner upon movement of said poppet member toward said valve closing position;

said disc having an outside diameter slightly larger than the inside diameter of said corner, means for maintaining an inner diameter section of said closure disc against said inner wall section, an outer diameter section of said closure member extending conically, yieldable means comprising an annular retaining member engaging said outer diameter section of said closure disc;

said retaining member having a second circular corner, said second corner having an outside diameter smaller than the inside diameter of said first corner, the difference between said last two mentioned diameters being less than twice the thickness of said disc whereby to apply a sealing force to said disc and against said first corner at an angle to the direction of movement of said poppet member upon movement of said poppet member to said valve closing position, and cooperating stop means on said body and said poppet member for preventing movement of said popped member beyond said valve closing position.

6. A valve device for cryogenic fluids comprising a body having an axial opening, port forming means in said opening comprising a first annular corner;

a poppet member movable axially in said opening between valve opening and valve closing positions, said poppet member forming a radially extending inner wall section and a coextensive at least substantially conically extending outer wall section, closure means on said poppet member comprising an annular yieldable closure disc engageable with said corner upon movement of said poppet member toward said valve closing position;

said disc having an outside diameter slightly larger than the inside diameter of said corner, a first yieldable means comprising an annular clamping member on said poppet for clamping an inner diameter section of said disc against said inner wall section, an outer diameter section of said disc extending at least substantially conically;

a second yieldable means including an annular retaining member slideable over said clamping member and normally engaging an outer diameter section of said disc with said outer wall section;

said retaining member having a second circular corner, said second corner having an outside diameter smaller than the inside diameter of said first corner, the difference between said last two mentioned diameters being less than twice the thickness of said disc whereby to apply a sealing force to said disc and against said first corner at an angle to the direction of movement of said poppet member upon movement of said poppet member to said valve closing position, and cooperating stop means on said body and said poppet member for preventing movement of said poppet member beyond said valve closing position.

7. A check valve comprising a body having an axial opening, port forming means in said opening comprising a first annular corner;

a poppet member movable axially in said opening between valve opening and valve closing positions, said poppet member forming a radially extending inner wall section and a coextensive at least substantially conically extending outer wall section, closure means on said poppet member comprising an annular yieldable closure disc engageable with said corner upon movement of said poppet member toward said valve closing position;

said disc having an outside diameter slightly larger than the inside diameter of said corner, means for clamping an inner diameter section of said disc against said inner wall section, an outer diameter section of said disc extending at least substantially conically, yieldable means comprising an annular retaining member and a compresison spring extending between said retaining member and said body for normally engaging said outer diameter section of said closure member with said outer wall section and to normally maintain said poppet member in said valve closing position;

said retaining member having a second circular corner, said second corner having an outside diameter smaller than the inside diameter of said first corner, the difference between said last two mentioned diameters being less than twice the thickness of said disc whereby to apply a sealing force to said disc and against said shoulder at an angle to the direction of movement of said poppet member when said poppet member is in valve closing position.

8. A valve device comprising a body having an axial opening, port forming means in said opening comprising a first annular corner;

a poppet member movable axially in said opening between valve opening and valve closing positions, said poppet member forming a radially extending wall section at least the outer portion of which extends at least substantially conically, closure means on said poppet member comprising an annular yieldable closure disc engageable with said corner upon movement of said poppet member toward said valve closing position;

said disc having an outside diameter slightly larger than the inside diameter of said corner, means for clamping said disc against said wall section, an outer diameter section of said closure disc extending at least substantially conically, yieldable means comprising an annular retaining member engaging said outer diameter section of said closure disc with said outer wall section, said retaining member having a second circular corner, said second corner having an outside diameter smaller than the inside diameter of said first corner, the difference between said last two mentioned diameters being less than twice the thickness of said disc whereby to apply a sealing force to said disc and against said first corner at an angle to the direction of movement of said poppet member upon movement of said poppet member to said valve closing position, and cooperating stop means on said body and said poppet member for preventing movement of said poppet member beyond said valve closing position.

9. A valve device comprising a body having an axial opening, port forming means in said opening comprising a first annular corner;

a poppet member movable axially in said opening between valve opening and valve closing positions, said poppet member forming a radially extending annular wall section at least the outer section of which extends at least substantially conically, closure means on said poppet member comprising an annular yieldable closure disc engageable with said corner upon movement of said poppet member toward said valve closing position;

said disc having an outside diameter slightly larger than the inside diameter of said corner, means for clamping said disc against said wall section, an outer diameter section of said closure member extending at least substantially conically, yieldable means comprising an annular retaining member normally engaging said outer diameter section of said disc with said outer wall section, said retaining member having a second circular corner, said second corner having an outside diameter smaller than the inside diameter of said first corner, the difference between said last last two mentioned diameters being less than twice the thickness of said disc whereby to apply a sealing force to said disc and against said first corner at an angle to the direction of movement of said poppet member upon movement of said poppet member to said valve closing position.

10. A valve device comprising a body having an axial opening, port forming means in said opening comprising a first annular corner;

a poppet member movable axially in said opening between valve opening and valve closing positions, said poppet member forming a radially extending annular wall section, closure means on said poppet member comprising an annular yieldable closure disc engageable with said corner upon movement of said poppet member toward said valve closing position;

said disc having an outer diameter slightly larger than the inner diameter of said corner, means for clamping an inner diameter section of said disc against said wall section, and yieldable means comprising an annular retaining member normally engaging an outer diameter section of said disc against said outer wall section, said retaining member having a second circular corner, said second corner having an outside diameter smaller than the inside diameter of said first corner, the difference between said last two mentioned diameters being less than twice the thickness of said disc whereby to apply a sealing force to said disc and against said first corner at an angle to the direction of movement of said poppet member upon movement of said poppet member to valve closing position.

11. A valve device comprising a body having an axial opening,
   a poppet member movable axially in said opening between valve opening and valve closing positions,
      said poppet member having a circular corner,
   port forming means in said opening comprising a radially inwardly extending annular wall at least the inner portion of which extends at least substantially conically,
      closure means comprising an annular yieldable closure disc,
         said disc having an inside diameter slightly smaller than the outside diameter of said corner, and
      means for clamping said disc against said wall, an inner diameter section of said closure disc extending at least substantially conically;
      said corner being engageable with said inner diameter section of said closure disc upon movement of said poppet member to valve closing position,
      yieldable means comprising an annular retaining member having a second annular corner normally engaging said inner diameter section of said closure disc with said inner wall portion,
      said first corner having an outside diameter smaller than the inside diameter of said second corner, the difference between said last two mentioned diameters being less than twice the thickness of said disc whereby to apply a sealing force to said disc and against said retaining member at an angle to the direction of movement of said poppet member upon movement of said poppet member to valve closing position,
   and cooperating stop means on said body and said poppet member for preventing movement of said poppet member beyond said valve closing position.

12. A valve device comprising a body having an axial opening,
   a poppet member movable axially in said opening between valve opening and valve closing positions,
      said poppet member having a first circular corner,
   port forming means in said opening comprising a radially inwardly extending annular wall at least the inner portion of which extends at least substantially conically,
      closure means comprising an annular thin yieldable closure disc;
         said disc having an inside diameter slightly smaller than the outside diameter of said corner, and
      means for clamping said disc against said wall an inner diameter section of said disc extending at least substantially conically;
      said corner being engageable with said inner diameter section of said disc upon movement of said poppet member to valve closing position, and
      yieldable means comprising an annular retaining member having a second annular corner normally engaging said inner diameter section of said closure disc,
         said first corner having an outside diameter smaller than the inside diameter of said second corner, the difference between said last two mentioned diameters being less than twice the thickness of said disc whereby to apply a sealing force to said disc and against said retaining member at an angle to the direction of movement of said poppet member upon movement of said poppet member to valve closing position.

13. A valve device for cryogenic fluids comprising a body having an axial opening,
   a poppet member movable axially in said opening between valve opening and valve closing positions,
      said poppet member having a circular corner,
   port forming means in said opening comprising a radially extending outer wall section and a coextensive at least substantially conically extending inner wall section,
      closure means comprising an annular thin yieldable closure disc,
         said disc having an inside diameter slightly smaller than the outside diameter of said corner,
      a first yieldable means comprising an annular clamping member in said opening for clamping an outer diameter section of said disc against said outer wall section, said inner diameter section of said disc extending at least substantially conically;
      a second yieldable means including an annular retaining member having a second annular corner, said retaining member being slideable axially within said clamping member and normally urging an inner diameter section of said disc against said inner wall section;
         said first corner having an outside diameter smaller than the inside diameter of said second corner, the difference between said last two mentioned diameters being less than twice the thickness of said disc whereby to apply a sealing force to said disc and against said returning member at an angle to the direction of movement of said poppet member upon movement of said poppet member to valve closing position,
   and cooperating stop means on said body and said poppet member for preventing movement of said poppet member beyond said valve closing position.

14. A valve device comprising a body having an axial opening,
   a poppet member movable axially in said opening between valve opening and valve closing positions,
      said poppet member having a first circular corner,
   port forming means in said opening comprising a radially inwardly extending annular wall,
      closure means comprising the annular thin yieldable closure disc,
         said disc having an inside diameter slightly smaller than the outside diameter of said corner,
      means for clamping said disc against said wall,
         said corner being engageable with an inner diameter section of said disc upon movement of said poppet member to valve closing position,
      and yieldable means comprising an annular retaining member having a second annular annular corner normally engaging said inner diameter section of said closure disc with said inner wall section;
         said first corner having an outside diameter smaller than the inside diameter of said second corner, the difference between said last two mentioned diameters being less than twice the thickness of said disc whereby to apply a sealing force to said disc and against said retaining member at an angle to the direction of movement of said poppet member, and said corners each having a radius less than the thickness of said seal.

References Cited by the Examiner

UNITED STATES PATENTS

| | | | |
|---|---|---|---|
| 1,274,680 | 8/18 | Calvert. | |
| 1,861,420 | 5/32 | Mahan | 137—516.29 |
| 2,073,112 | 3/37 | Lindineer | 251—333 |
| 2,243,863 | 6/41 | Hoy | 251—174 XR |
| 2,639,728 | 5/53 | Briechle | 137—625.27 |
| 2,666,448 | 1/54 | Garretson | 251—375 XR |
| 2,880,750 | 4/59 | Amison | 137—516.29 XR |
| 2,920,653 | 1/60 | Wolff | 251—357 |
| 2,928,417 | 3/60 | Buckner | 137—541 XR |
| 2,940,472 | 6/60 | Chilcoat | 251—364 XR |
| 2,971,090 | 2/61 | Piet | 251—357 XR |

M. CARY NELSON, *Primary Examiner.*

MARTIN P. SCHWADRON, *Examiner.*